(12) United States Patent
Wang

(10) Patent No.: US 9,757,735 B2
(45) Date of Patent: Sep. 12, 2017

(54) INTEGRATED-STRUCTURE ELECTROSTATIC DUST COLLECTION DEVICE AND ELECTRET PROCESSING TECHNIQUE THEREOF

(75) Inventor: Baozhu Wang, Changping Dongguan (CN)

(73) Assignee: DONGGUAN UNICLEAR NEW-MATERIAL CO., LTD, Changping Dongguan (CN)

( * ) Notice: Subject to any disclaimer, the term of this patent is extended or adjusted under 35 U.S.C. 154(b) by 160 days.

(21) Appl. No.: 14/368,803

(22) PCT Filed: Apr. 11, 2012

(86) PCT No.: PCT/CN2012/073771
§ 371 (c)(1),
(2), (4) Date: Jun. 26, 2014

(87) PCT Pub. No.: WO2013/097375
PCT Pub. Date: Jul. 4, 2013

(65) Prior Publication Data
US 2014/0373717 A1 Dec. 25, 2014

(30) Foreign Application Priority Data

Dec. 29, 2011 (CN) .......................... 2011 1 0453643

(51) Int. Cl.
*B03C 3/36* (2006.01)
*B03C 3/64* (2006.01)
(Continued)

(52) U.S. Cl.
CPC ................ *B03C 3/361* (2013.01); *B03C 1/30* (2013.01); *B03C 3/025* (2013.01); *B03C 3/09* (2013.01);
(Continued)

(58) Field of Classification Search
CPC combination set(s) only.
See application file for complete search history.

(56) References Cited

U.S. PATENT DOCUMENTS

| 6,193,788 B1 * | 2/2001 | Nojima | B03C 3/40 |
| | | | 29/34 R |
| 2006/0130658 A1 * | 6/2006 | Chang | B03C 3/12 |
| | | | 96/77 |

(Continued)

FOREIGN PATENT DOCUMENTS

JP 11090265 A * 4/1999

*Primary Examiner* — Duane Smith
*Assistant Examiner* — Sonji Turner

(57) ABSTRACT

An integrated electrostatic dust collection device for efficiently capturing particles in air and an electret processing technique thereof comprises a main body formed by stacking a plurality of layers of dust collection boards; wherein the dust collection boards are integrated with hole for air to pass through and are formed with micro-foaming, to which plastic materials of an electret enhancement material, a negative ion emission material, and a magnetic material can be added; the upper and lower surfaces of each layer of dust collection board are disposed with an enclosed conductive film applied with a high-voltage electric field, and one or more layers of dust collection boards can be installed with an ion emission device; a stacked structure and a high-voltage power supply are integrally packaged in the outer frame of the protection structure, and a low-voltage direct current or mains power is used externally to supply power.

9 Claims, 7 Drawing Sheets

(51) Int. Cl.
    B03C 1/30      (2006.01)
    B03C 3/02      (2006.01)
    B03C 3/09      (2006.01)
    B03C 3/28      (2006.01)
    B03C 3/41      (2006.01)
    B03C 3/60      (2006.01)
    B29C 44/42     (2006.01)
    B29K 23/00     (2006.01)
    B29K 27/18     (2006.01)
    B29K 67/00     (2006.01)

(52) U.S. Cl.
    CPC ............... *B03C 3/28* (2013.01); *B03C 3/41* (2013.01); *B03C 3/60* (2013.01); *B03C 3/64* (2013.01); *B29C 44/42* (2013.01); B29K 2023/06 (2013.01); B29K 2023/12 (2013.01); B29K 2027/18 (2013.01); B29K 2067/003 (2013.01)

(56) References Cited

U.S. PATENT DOCUMENTS

| | | | |
|---|---|---|---|
| 2007/0107597 A1* | 5/2007 | Cheung | B01D 53/885 96/16 |
| 2011/0209620 A1* | 9/2011 | Nazuka | B03C 3/09 96/62 |
| 2013/0220128 A1* | 8/2013 | Gu | B03C 3/34 96/86 |

* cited by examiner

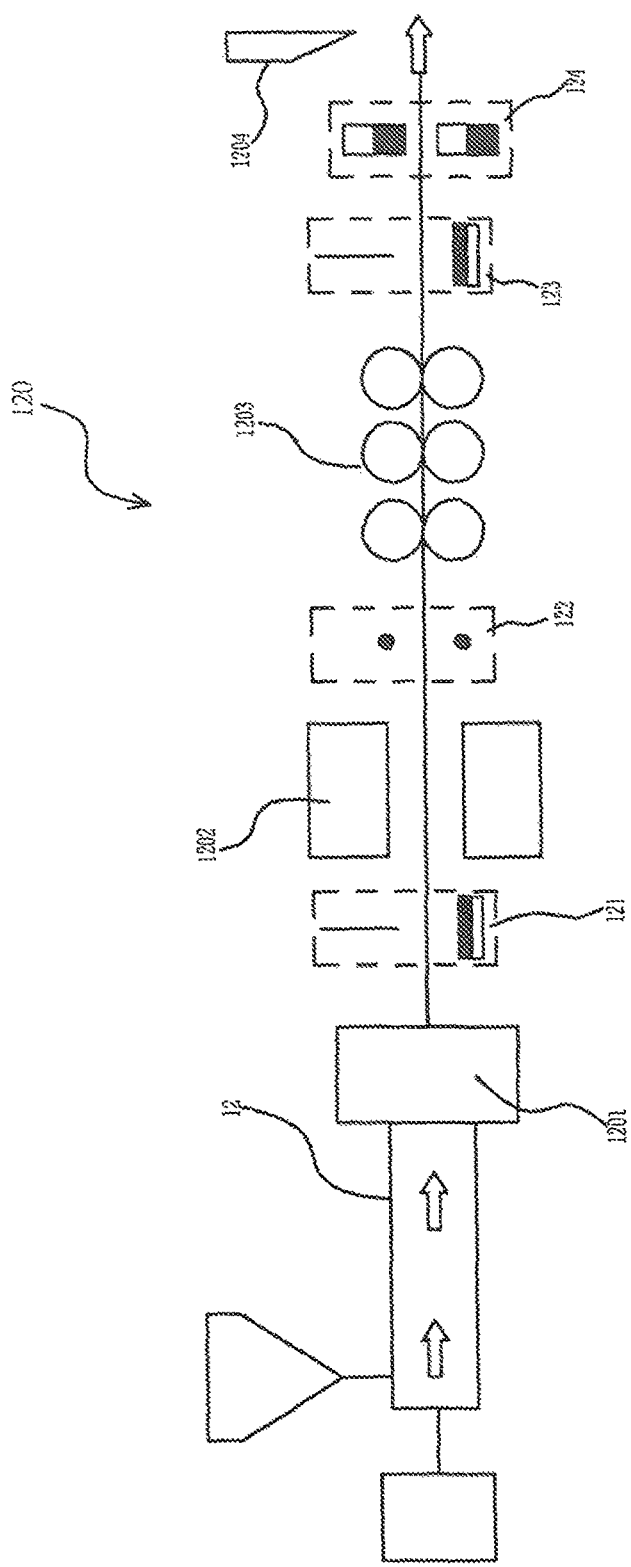
Fig. 3
Fig. 4
Fig. 5

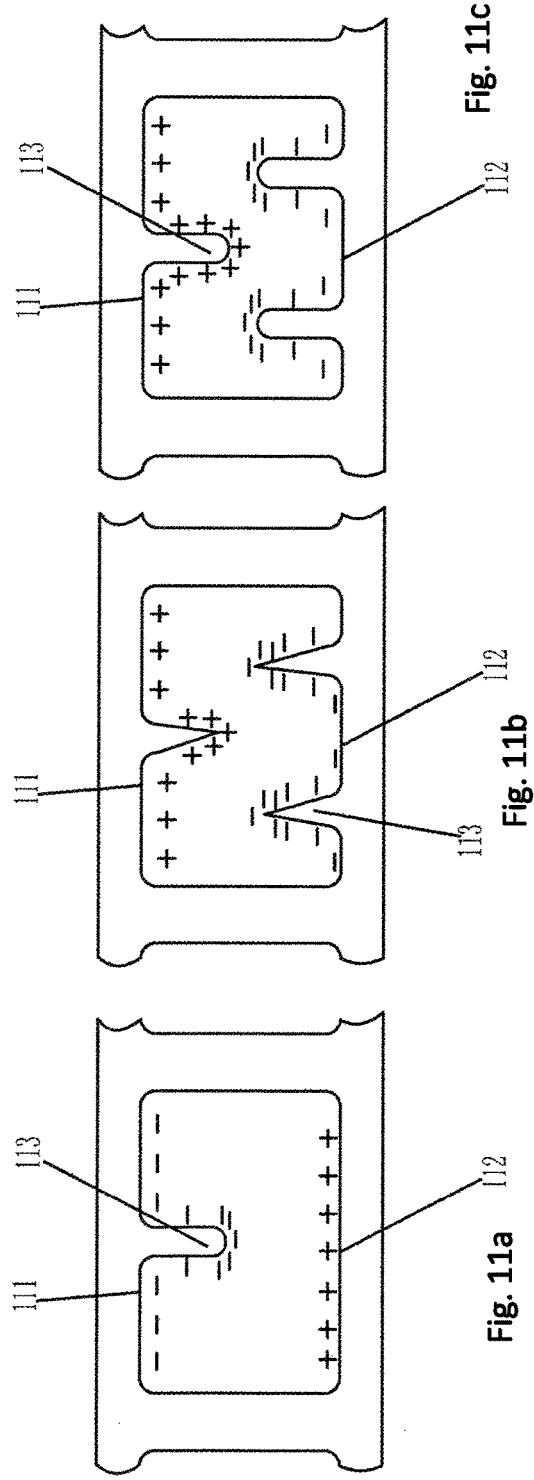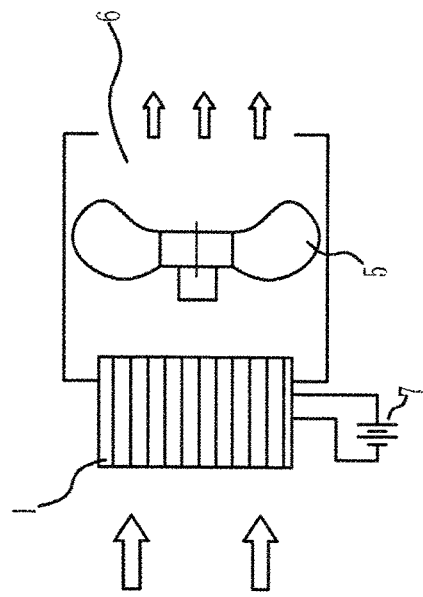

| Embodimnet | KV internal surface voltage | | electrode voltage | input power | CARD value | blower power | energy efficiency ratio value | Ozone concentration |
|---|---|---|---|---|---|---|---|---|
| | anode wall | cathode wall | KV | mW | cfm | W | | ppb |
| 1 | – | – | 10 | 312 | 126 | 31.3 | 4.03 | 5.6 |
| 2 | -6.8 | 5.4 | 10 | 305 | 146 | 30.8 | 4.74 | 7.3 |
| 3 | – | – | 10 | 319 | 137 | 30.5 | 4.49 | 7.5 |
| 4 | -11.8 | 7.7 | 10 | 322 | 159 | 30.2 | 5.26 | 8.4 |
| 5 | – | – | – | – | 96 | 31.1 | 3.09 | – |
| 6 | -9.2 | 6.3 | 10 | 317 | 167 | 30.6 | 5.46 | 10.4 |
| 7 | -10.8 | 7.6 | 10 | 309 | 178 | 31.1 | 5.72 | 9.6 |
| 8 | -12.6 | 7.9 | 10 | 309 | 188 | 30.9 | 6.08 | 8.9 |
| 9 | -11.2 | 6.2 | 10 | 311 | 182 | 30.9 | 5.89 | 8.3 |
| 10 | – | – | 10 | 313 | 174 | 31.0 | 5.61 | 9.1 |
| 11 | – | – | 10 | 308 | 201 | 30.7 | 6.55 | 12.4 |
| 12 | – | – | 10 | 312 | 176 | 31.0 | 5.68 | 9.5 |
| 13 | – | – | 10 | 316 | 183 | 31.5 | 5.81 | 7.8 |
| 14 | – | – | 10 | 313 | 194 | 31.3 | 6.20 | 8.2 |
| 15 | – | – | 10 | 312 | 227 | 31.3 | 7.25 | 13.1 |
| 16 | – | – | 6 | 267 | 142 | 30.6 | 4.64 | 5.5 |
| 17 | – | – | 8 | 294 | 161 | 31.2 | 5.16 | 6.4 |
| 18 | – | – | 12 | 342 | 229 | 31.1 | 7.36 | 12.1 |

Fig. 16

| Combo-ESP water wash resistance test | | | | | | | | | | |
|---|---|---|---|---|---|---|---|---|---|---|
| test times | 1 | 2 | 3 | 4 | 5 | 6 | 7 | 8 | 9 | 10 |
| CARD value | 192 | 190 | 191 | 188 | 186 | 182 | 185 | 187 | 182 | 183 |

Fig. 17

| Embodiment | testing surface | 0 | 6 | 12 | 18 | 24 | 30 | 36 | 42 | 48 | 54 | 60 | 66 | 72 | risdual rate |
|---|---|---|---|---|---|---|---|---|---|---|---|---|---|---|---|
| 2 | + | -6.8 | -4.1 | -3.7 | -3.6 | -3.6 | -3.5 | -3.3 | -3.3 | -3.3 | -3.3 | -3.1 | -2.9 | -2.7 | 39.71% |
| | – | 5.4 | 3.9 | 3.6 | 3.3 | 3.2 | 3.2 | 3.1 | 3.0 | 3.0 | 2.8 | 2.7 | 2.6 | 2.6 | 48.15% |
| 4 | + | -11.8 | -8.4 | -6.3 | -5.7 | -5.3 | -5.1 | -4.8 | -4.6 | -4.6 | -4.4 | -4.3 | -4.2 | -4.2 | 35.59% |
| | – | 7.7 | 5.5 | 4.6 | 4.1 | 4.0 | 4.0 | 3.8 | 3.7 | 3.7 | 3.8 | 3.8 | 3.7 | 3.7 | 48.05% |
| 6 | + | -9.2 | -8.2 | -7.8 | -7.5 | -7.4 | -7.4 | -7.3 | -7.3 | -7.1 | -7.2 | -7.0 | -7.1 | -7.0 | 76.09% |
| | – | 6.3 | 5.4 | 5.2 | 4.8 | 4.7 | 4.5 | 4.4 | 4.5 | 4.4 | 4.3 | 4.3 | 4.2 | 4.2 | 66.67% |
| 7 | + | -10.8 | -9.6 | -9.4 | -9.2 | -9.1 | -9.1 | -8.8 | -8.9 | -8.8 | -8.6 | -8.6 | -8.5 | -8.5 | 78.70% |
| | – | 7.6 | 6.1 | 5.6 | 5.4 | 5.2 | 5.2 | 5.1 | 5.0 | 5.1 | 5.0 | 4.9 | 4.9 | 4.7 | 61.84% |
| 8 | + | -12.6 | -9.4 | -9.1 | -9.0 | -8.8 | -8.7 | -8.7 | -8.5 | -8.5 | -8.5 | -8.5 | -8.5 | -8.5 | 67.46% |
| | – | 7.9 | 6.4 | 5.8 | 5.6 | 5.5 | 5.5 | 5.4 | 5.4 | 5.3 | 5.4 | 5.3 | 5.2 | 5.2 | 65.82% |
| 9 | + | -11.2 | -9.2 | -8.7 | -8.4 | -8.2 | -8.1 | -8.1 | -8.0 | -8.0 | -7.9 | -7.9 | -7.8 | -7.8 | 69.64% |
| | – | 6.2 | 5.6 | 5.4 | 5.1 | 5.1 | 5.0 | 4.8 | 4.7 | 4.7 | 4.7 | 4.6 | 4.5 | 4.5 | 72.58% |

Fig. 18

INTEGRATED-STRUCTURE ELECTROSTATIC DUST COLLECTION DEVICE AND ELECTRET PROCESSING TECHNIQUE THEREOF

TECHNICAL FIELD

The present invention relates to the technical field of air filter products, and more particularly to an integrated electrostatic dust collection device for capturing dust particles in air. It is applicable for the domestic air purifier, central air-conditioner, vacuum cleaner and industrial purifier, and especially for those devices of low air resistance and high efficiency. When the dust collection boards are made of anti-corrosive and high-temperature resistant fluoroplastic, the present invention can also be used in the corrosive and high-temperature air treatment environment.

BACKGROUND TECHNOLOGY

Presently, there are mainly two technologies available for removing particles in air as follows:

I. A filter formed by folding non-woven fiber filter papers, represented by HEPA (High Efficiency Particulate Air Filter), which intercepts particles through sieving, bridging, impact adhesion, absorption by electric field created by electrostatic electret fiber and others. With such advantages as simple structure and high efficiency, it is widely applied. However, HEPA suffers from the following disadvantages:

1) Greater air resistance. The preset air quantity requires a blower of greater power, and this causes large energy consumption and loud noise.

2) It requires regular replacement, and is not reusable, leading to huger costs.

II. An electrostatic dust collection device, represented by ESP (Electrostatic Precipitator) using the corona-collection mode. With such advantages as low air resistance and good reusability, it is also widely applied. However, ESP has also its disadvantages that cannot be easily overcome as below:

(1) Corona discharge may produce ozone. Though ozone produced can be controlled by an ozone catalytic filter, it is likely to go beyond the increasingly stricter concentration control index range, and do harm to bodily health.

(2) The slight inter-electrode lighting discharge noise is what the users usually complain of, and it also impairs the product's use safety.

(3) As the breakthrough voltage is limited by the open structure, EPS has lower single filtering efficiency.

(4) The complex high-voltage power supply and high-voltage safety precautions are required, and so the device costs are improved.

(5) EPS structure, especially circuit board structure, is quite fragile and liable to damages when cleaned.

To remove such disadvantages of EPS as above, the public specification of the invention patent application, China Patent Application No. 00806175.0, discloses an "air purification device" that is developed from EPS. The technical solution adopted by the invention can be described as follows: a device used to remove particle deposit from air, including hole arrays through which air can relatively freely pass, and said hole arrays disposed between plastic walls; a device used to force air to pass through hole arrays, and said plastic walls having a conductive material zone that comes in contact with said device; and a device used to apply high and low potentials to the insulated conductive material zone alternately, to create an electric field in arrays, so that it can capture particles from air.

Said solution presents a series of structures and modes of combination, and "disposing electrodes on both surfaces of the plastic double walled waveform boards, and then stacking said boards alternately" is an important embodiment of the invention, but there are still many problems not solved yet, including:

1. The symmetric dust collection board structure with smooth inner walls, due to Faraday cage effect, is unable to efficiently capture uncharged (neutral) particles, and so needs a negative ion generator or to reduce the height of the dust collection boards or longer holes, which may bring about many adverse effects, including greater air resistance, over large size of installation and others.

2. The electrodes come in direct contact with the outside of the plastic injected dust collection boards, as a result of which said electrodes may, in the presence of micropore plastic injection defects in the dust collection boards, discharge to air or relevant inner wall, and produce odor.

3. To meet the requirements for waterproofing and entire structure strength, adhesives are applied between the dust collection boards, especially two component adhesives that can enhance adhesion of PP materials. The use of said adhesives may cause odor to long exist in the filter, and result in secondary air pollution.

4. The electret mentioned in said solution cannot generate charges that can be long stored for the plastic materials mentioned therein, and said charges stored on surfaces may be gone several days or weeks later.

5. The repetitively stacked structure may still produce greater plate condenser effect. Although the high-impedance electrodes are used, or the drain resistors are disposed at the electrode end, it is still likely that an electric shock takes place in the exposed contact zone within the early several seconds.

6. The external high-voltage input mode used is the same as ESP's power supply mode, and so a complex safety circuit is needed.

7. The non-enclosed structure may allow the electrodes to come in contact with air and water, and so said electrodes are easily liable to aging and leakage, which may cause harm to the repeated water washing process.

To solve the problems above, the inventors, through lots of studies and experiments, now present the solutions as follows:

Contents of Invention:

The technical problems to be solved by the present invention are the defects in the existing similar products, and it is designed to provide an integrated electrostatic dust collection device that can improve capturing efficiency and features safe use and simple operation.

To solve the technical problems above, the present invention adopts the technical solution as follows: the device includes the outer frame and the main body packaged in said outer frame, said main body consists of several integrated micro electrostatic dust collection cells that are distributed in the form of array, the each said micro electrostatic dust collection cell has a linear or curvilinear hole for air to pass through, the upper and lower walls of said hole are non-symmetric, on which the eudipleural fins are disposed, and the upper and lower surfaces of the each said micro electrostatic dust collection cell are disposed with an enclosed conductive film applied with a high-voltage electric field; the high-voltage power supply used to create a high-voltage electric field is packaged in said outer frame, and a contact or socket on said outer frame is used externally to supply low-voltage power.

Furthermore, said micro electrostatic dust collection cells are integrated on a dust collection board. Said dust collection board is formed by injecting materials of electret nature, to which any kind of the following materials or combination thereof can be added: a) microporous foaming agent using nitrogen as micro-foaming gas, whose mass ratio ranges between 0.1% and 10%, and which can form lens like or spindle shaped micro-bubbles; b) first additive that can enhance the electret performance and extend the storage time of charges, including disproportionated rosin, PVDF, PTFE, calcium stearate, aluminum palmitate and ferroelectrics, which can be added alone or in a combined fashion, adding mass ratio ranging between 0% and 20%; c) second additive possessed of natural electret characteristics and emission characteristic of negative ion, including mixture of electrical powder or tourmaline and lanthanide series, adding mass ratio ranging between 0% and 15%; d) third additive made of magnetic powders, including dyestuff mainly containing $Fe_3O_4$, ferrite material and Nd—Fe—B material that can be externally magnetized, adding mass ratio ranging between 0.1% and 5%.

Furthermore, in said technical solution, said enclosed conductive film forms the "film-electrode-film" composite structure through adhesion, thermal sealing and ultrasonic, and the electrode is made on a layer of film in the intended pattern through printing or vacuum coating.

Furthermore, in said technical solution, said film refers to thin film, hole film and microporous film, and they are made of PP, PE, PET or PTFE. Said electrode is formed by: a) low-resistance self-healing vacuum aluminum film, resistance ranging between 0.1 Ω/m and 100 Ω/m; or b) high-resistance printable film that is made of metal oxide, carbon macromolecular conductive material and adhesive material, resistance ranging between 10E8 Ω/m and 10E11 Ω/m. And said high-resistance electrode is printed in the intended pattern, and said pattern is a herringbone pattern having line edges and sharp prickles on it, and the coverage of electrode varies from 10% to 90%.

Furthermore, in said technical solution, the dust collection boards contained in said main body are stacked in such a order as: dust collection board-low-potential film electrode-dust collection board-high-potential film electrode-dust collection board, the safety distance of 0.5~1.5 mm/Kv is reserved between the edge of the film electrode and the edge of the dust collection board, and the electret polarity of the dust collection board corresponds to the electrode potential. The two adjacent dust collection boards are alternately stacked at an angle of 1~30°.

Furthermore, in said technical solution, said main body is disposed with one or more negative ion dust collection board (s) having built-in negative ion emission electrode, within the hole of said negative ion dust collection board a negative ion emission electrode is housed, and said hole of the negative ion dust collection board is of symmetric structure. Near the end a needle or prickle-like brush emission electrode made of W, Mo or stainless steel or a filamentous brush emission electrode made of conductive carbon fiber is disposed, and the distance from the emission electrode to the end is 1.0~1.5 mm/KV.

Furthermore, in said technical solution, said two adjacent dust collection boards are joined through hot-melt adhesive or binder, and the edges of these two adjacent dust collection boards are bonded through thermal fusion into an enclosed edge.

Furthermore, in said technical solution, said high-voltage power supply is installed at any side of the main body where neither inlet nor outlet is set. The output end of said high-voltage power supply is connected to ends of high and low potential of each electrode film through collective line, and the negative high-voltage end of said high-voltage power supply is connected to the negative ion emission electrode on the negative ion dust collection board.

Furthermore, in said technical solution, said outer frame is made of plastic or metal, and the main body and the high-voltage power supply are integrally packaged in the outer frame through sealing process, namely, a seal coating is formed between the outer frame and main body, and on the outer frame a socket or contact is installed for supplying power to the high-voltage power supply.

To further improve the integration effect of the integrated-structure electrostatic dust collection device mentioned in said technical solution, the present invention adopts the following electret processing technique, and said electret processing consists of three steps as follows:

I. The dust collection boards are once shaped by the injection molding machine, and during this process, the dust collection boards also undergo electret processing and magnetization. The process consists of four steps as follows: a) the first positive or negative corona electret processing is conducted at the outlet of the injection mold and the inlet of the cooling section, using such tools as needle board, wire board, wire, needle-medium baffle and wire-medium baffle, and the voltage difference of the electret varies from 10 Kv to 50 Kv; b) the second electret processing is conducted between the cooling section and traction section using needle board, wire board and wire-wire type electret, in which the polarity is opposite to that in the a) step, and the voltage difference of the electret varies from 5 Kv to 30 Kv; c) At the front end of the cutting device, the third electret processing is conducted with the same electret and polarity as the a) step, and the voltage difference of the electret varies from 20 Kv to 70 Kv; d) A magnetization mechanism is set between the corona device having experienced the third electret processing above and the cutting device, the magnetic field strength being 0.1~10 T.

II. Electret processing of the enclosed conductive film. The film electrode in the enclosed conductive film is connected to the high-voltage power supply, and the electric field formed by the heating zone and cooling zone is applied to perform continuous electret processing.

III. After the filter finishes its integral packaging, the electret device is used to conduct entire electret processing, which consists of the steps as follows: first, the contact or socket is allowed to supply power to the filter, and in the state of power supply, the subsequent steps are performed;

Next, the vapor or hot air is used to heat the filter to 70~100° C., and the reached temperature is maintained for 0~30 min; then, the filter is placed in the heater for 0~60 min at 60~80° C.; last, air or cool air is allowed to quickly pass through the holes of the dust collection boards of the filter for 1~20 min, to cool down the filter.

The present invention adopts the above-mentioned technical solution to form an integrated-structure electrostatic dust collection device (Uni-ESP). Compared with the current similar products, the invention has the following advantages:

1. The upper and lower walls of the rectangular holes on the dust collection boards are of non-symmetric design, on which the fins are distributed. The use of the non-symmetric structure increases the internal surface area of the holes, shortens the distance between the internal surface walls, allows the particles to come into contact with the inner walls and then be captured within a shorter range, and realizes greater capturing efficiency by use of possibly shortest holes.

2. The use of the non-symmetric structure renders distribution of the internal electric field non-symmetric, so that the non-charged particles or those that cannot be easily charged can be efficiently captured.

3. In the present invention, the hole arrays of curved structure can also be made. When air carrying particles passes through the hole arrays, the particles can more easily come into contact with the hole walls and so be more efficiently captured.

4. To the plastic materials making up the hole walls and fins the additives that can enhance electret performance and extend the storage time of charges can be added, to charge the particles passing through the invention and so improve the dust collection effect.

5. The present invention can be installed with a negative ion emission device in it, so that in the presence of air flow, the negative ions generated can be diffused to air, to charge the particles and so improve the dust collection effect.

6. In the present invention, to the plastic materials making up the dust collection boards the magnetic materials can also be added, which may create a magnetic field on the upper and lower surfaces of the dust collection boards through external magnetization. Under the action of the magnetic field, the charged particles deflect to right and left from their course due to Lorentz force, and are then captured onto the surfaces of the right and left inner walls of the holes. In this way, the present invention uses both electric field deflection and magnetic field deflection techniques, increasing particle capturing efficiency, making full use of all surfaces of hole walls, and also improve dust containing capacity.

In addition, to further enhance the dust collection effect, the present invention presents solutions to the problems that the general plastic materials have poorer electret performance and that the storage time of the electret charges is shorter, and it also discloses an electret processing technique. The electret processing technique means that the materials used for the dust collection boards are directly charged by electret during their injection molding, and the filter is charged as a whole, to further enhance the electret performance. Said electret processing technique combines electret charging and magnetization techniques for the dust collection boards, so as to maximize charge capturing efficiency, obtain high-voltage and long-duration electret material, and also create a magnetic field of even distribution. And the present invention also discloses an entire electret processing method for the integrated-structure electrostatic dust collection device, to endow the device with better performance.

To realize a stronger electric field and safer use, the present invention designs an enclosed conductive film of 3-layer structure. The film structure designed by the present invention provides adequate insulation and protection for the conductive film, frees the conductive film from the insulation problem arising during its use or caused by entry of water during its cleaning, and also protects the conductive film from change in resistance value and break due to ageing during its service.

The present invention designs an integrated structure. The electrodes of high and low potentials, after gathered, are connected to the high-voltage power supply installed at any side other than inlet or outlet side, and then the plastic or metallic outer frame are used to form an integrated-structure electrostatic dust collection device through sealing and packaging. On the outer frame a contact or socket for supplying power to the transformer is installed, and in this way, an integrated-structure electrostatic dust collection device (Uni-ESP) is formed.

BRIEF DESCRIPTION OF THE DRAWINGS

FIG. 3 illustrates the schematic diagram of electrostatic electret processing of the dust collection boards of the present invention on the production line;

FIG. 4 illustrates the structural diagram of the enclosed conductive film of the present invention;

FIG. 5 illustrates the schematic diagram of the electrode pattern in the enclosed conductive film of the present invention;

FIGS. 11a~11c illustrate the schematic diagram of the internal structure of the dust collection boards according to other embodiments of the present invention;

FIG. 13 illustrates the schematic diagram of the testing device of the present invention;

FIG. 16 illustrates the testing data sheet according to the embodiments 1-18 of the present invention;

FIG. 17 illustrates the testing data sheet according to the embodiment 19 of the present invention;

FIG. 18 illustrates the testing data sheet according to the embodiment 20 of the present invention;

SPECIFIC METHOD OF EMBODIMENT

Embodiment 1

Figure 1:
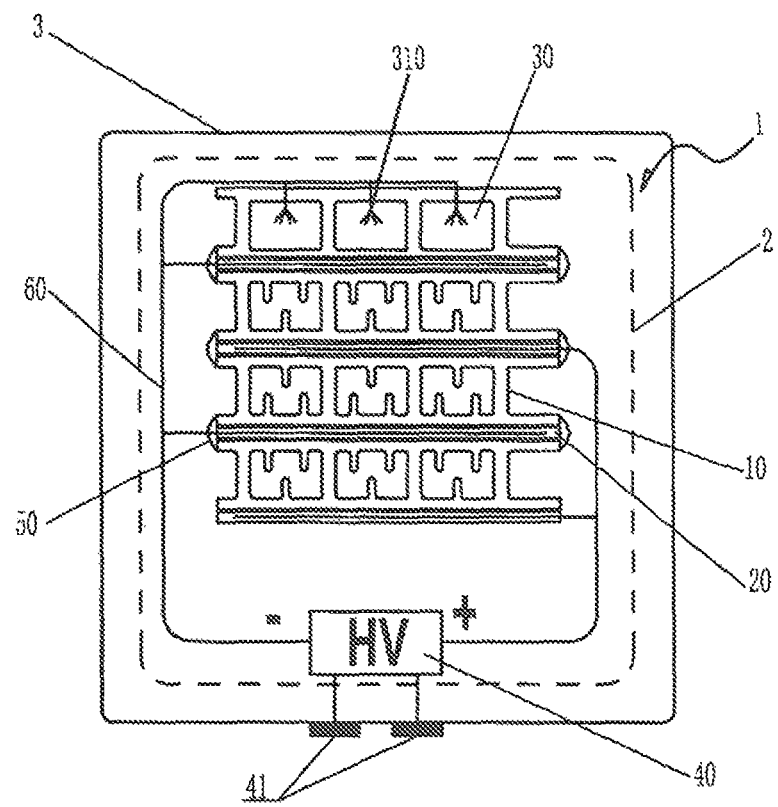
FIG. 1 illustrates the structural diagram of the main body of the present invention.

The present invention is an electrostatic dust collection device used for air purification, as shown in FIG. 1. The device consists of the main body (1) as a dust collection device and an outer frame (3) used for packaging the main body (1).

Said main body (1) comprises many micro electrostatic dust collection cells (100) that are distributed in the form of array, and the upper and lower surfaces of each said micro electrostatic dust collection cell (100) are disposed with an enclosed conductive film (20) applied with a high-voltage electric field.

Each said micro electrostatic dust collection cell (100) has a linear or curvilinear hole (110) for air to pass through, the upper wall (111) and lower wall (112) of said hole (110) are asymmetric, and on the upper wall (111) and lower wall (112) the eudipleural fins (43) (113) are distributed.

Said micro electrostatic dust collection cells (100) are integrated on the dust collection board (10), said main body (1) is formed by stacking a plurality of layers of dust collection boards (10), and each said hole (110) forms a non-symmetric micro electrostatic dust collection cell (100) of the utility model. The enclosed conductive film (20) is located between the dust collection boards (10).

Figure 2:
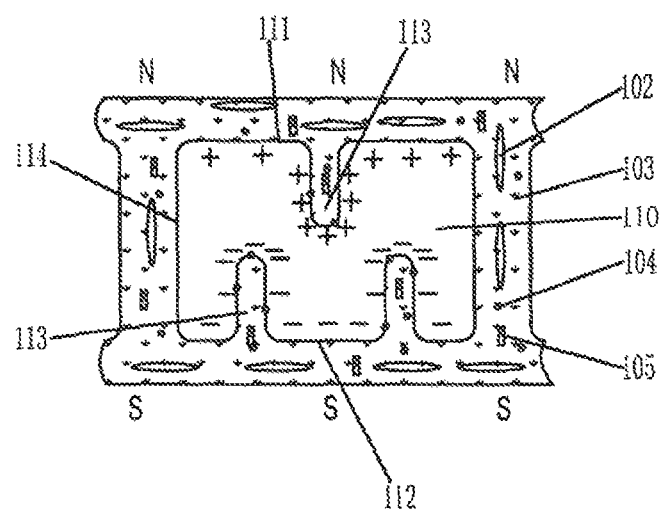
FIG. 2 illustrates the structural diagram of the holes of the dust collection boards of the present invention.

Said dust collection board (10) can be formed by injecting such materials of electret nature as PP, PE, PC, PVC, PVDF and PTFE. In the meanwhile, to said materials the microfoaming plastic materials of an electret enhancement material, a negative ion emission material and a magnetic material can be added. As shown in FIG. 2, the non-symmetric micro electrostatic dust collection cells (100) are directly integrated on the dust collection board (10), and the structure adopted is as follows: on the dust collection board (10), there are linear hole arrays for air to pass through. In the embodiment, the parallel hole (110) arrays are applied, the section of the hole (110) is designed to be rectangular, and the upper wall (111) and lower wall (112) are asymmetric, namely, on the upper wall (111) and lower wall (112) the eudipleural fins (113) are distributed.

As shown in FIGS. 11*a*~11*c*, in the embodiment, the fins (113) can adopt many kinds of structure, e.g. columnar fins (113) are formed at a side; the upper wall (111) and lower wall (112) form cuniform fins (113) alternately (see FIG. 11*b*); the upper wall (111) and lower wall (112) form columnar fins (113) alternately (see FIG. 11*c*).

Figure 12:
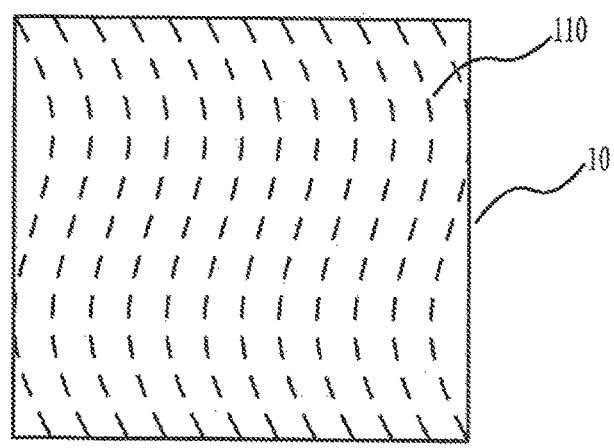
FIG. 12 illustrates the schematic diagram of the dust collection boards according to an embodiment of the present invention using the curved hole structure.

Besides, as shown in FIG. 12, the hole (110) can be either linear or curvilinear.

In the embodiment and other embodiments, the dust collection boards of this structure are used, and their parameters are given as below:

Material: PP; isotacticity: >95%; specific gravity: 0.9 g/cm3;

Thickness: 3 mm;

Weight: 290~320 g/m2;

Hole section: rectangular, 5 mm wide;

Fin: 1 mm high, 0.5 mm thick at bottom, 0.1 mm thick at top;

Fin distribution: 1 piece on upper wall, 2 pieces on lower wall.

On this basis, more components and processing techniques are added to form the dust collection board (10) in the embodiment, and the generally accepted techniques and practices are adopted for adding other materials or components.

The dust collection board (10) is formed by injection and then cooled. It is divided into rectangular slices of 60 mm width and 550 mm length.

Figure 6:
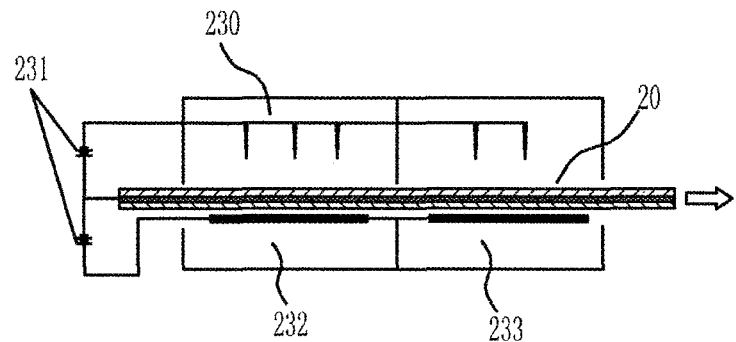
FIG. 6 illustrates the schematic diagram of electret processing of the enclosed conductive film of the present invention.

As shown in FIG. 4, the enclosed conductive film (20) is of film (210)-electrode (220)-film (210) composite structure. Said film (210) is thin film, hole film and microporous film made of PP, PE, PET, PTFE and others; said electrode (220) is made on a layer of film in the intended pattern through printing or vacuum coating, and then forms the "film-electrode-film" composite structure through adhesion, thermal sealing and ultrasonic. The specific making method can be as follows: the 50 mm wide, 50 um thick PP film is used as the film (210) of the enclosed conductive film (20), on which 40 mm wide conductive ink of 200~500 MΩ/m resistance is printed in the lengthwise direction as the electrode (220). 25 um PP film is used as overlay film and forms said enclosed conductive film (20) through thermal lamination. As shown in FIG. 6, said enclosed conductive film (20), after made, experiences electret processing, to improve the performance of the filter, and the concrete process is as follows: the electrode (220) of said enclosed conductive film (20) is connected to the high-voltage power supply (231), and then undergoes continuous electret processing through the electric field (230) formed by the heating zone (232) and the cooling zone (233). Said high-voltage power supply (231) is of 20 KV. The electret processing duration is 5 min at 90° C. in the state of power supply and another 10 min at room temperature.

In the present invention, the electrode (220) can also be made of:

a. Low-resistance self-healing vacuum aluminum film, resistance being 0.1~100 Ω/m. The advantage of this kind of film is that if any inter-electrode high-voltage lighting arises, the aluminum film at the breakdown point will evaporate quickly, and discharge at the lighting point stops with disappearance of the conductor, and then lighting is ceased. Later, gradual healing takes place at the evaporation point, and a conductive film of higher impedance is formed. In this way, the electrode's performance required by Uni-ESP is restored.

b. High-resistance printable film, made of macromolecular conductive materials like metal oxide and carbon and adhesive materials, resistance being 10E7~10E10 Ω/m. The advantage of this kind of film is that its conducting mode is dissipative, and if any inter-electrode high-voltage lighting arises, discharge at the lighting point stops with consumption of electrons, and then lighting is ceased. Neither continuous local arc discharge nor high temperature will happen, and so use safety is ensured.

In addition, said high-resistance electrode is printed in the intended pattern. As shown in FIG. 5, said pattern of the electrode (220) is a herringbone pattern (221) having line edges and sharp prickles on it, and the coverage of electrode varies from 10% to 90%. The advantage of the herringbone pattern (221) electrode structure designed in the present invention is that the tips and edges can improve the electric field strength, and furthermore, the minor spaces between the electrode (20) and the outer wall of the dust collection board (10) may form the potential trap structure that can enhance the charge electret performance of the dust collection board.

It can be seen from above that the present invention uses an enclosed conductive film of 3-layer structure, which can provide adequate insulation and protection for the conductive film as the electrode (220), free the electrode (220) from the insulation problem arising during its use or caused by entry of water during its cleaning, and also protect the electrode (220) from change in resistance value and break due to ageing during its service. The advantage of the enclosed conductive film (20) is that with its excellent insulation, it further avoid inter-electrode lighting that may result from injection defects in the dust collection boards.

Said enclosed conductive film (20) is located on the upper and lower surfaces of the dust collection board (10), and used to apply a high-voltage electric field. The high-voltage power supply (40) for supplying power to the enclosed conductive film (20) are packaged within the outer frame (3), and supplies low-voltage power through the external contact (41) on the outer frame (3). Said high-voltage power supply (40) is installed at any side of the main body (1) other than inlet or outlet side.

Said high-voltage power supply (40) of the present invention can be an ordinary high-voltage power supply, but the preferred choice is a piezoelectric ceramic transformer power supply. The advantage of this piezoelectric ceramic transformer power supply is that it fits the present invention better in terms of load, and has also such advantages as small size, high efficiency and electromagnetic interference free. In the embodiment, the high-voltage power supply (40) adopts a piezoelectric ceramic transformer power supply of 2 W service power, and its high output voltage can be adjusted within the 6~12 KV range through input voltage.

The outer frame (3) is made of plastic or metal, in which the main body (1) and the high-voltage power supply (40) are integrally packaged through sealing, namely, a seal coating (2) is formed between the outer frame (3) and main body (1), and on the outer frame (3) a socket or contact is installed for supplying power to the high-voltage power supply (40).

In the embodiment, the dust collection boards (10) are formed by injecting PP virgin material, and, after cut, stacked with the prefabricated enclosed conductive film (20) alternately, to form an electrode structure containing 49 slices and 24 pairs, with thickness of about 150 mm. Two adjacent dust collection boards (10) are stacked in an overlapping manner. And they can also be stacked alternately, at an angle of 1~30°. The advantage of alternate stacking is that the holes (110) of the two adjacent dust collection boards (10) vary in direction, and so the particles can enter the holes (110) in different direction and be more easily captured.

Figure 7:
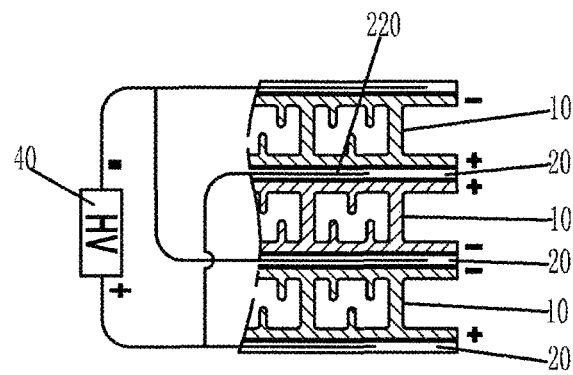
FIG. 7 illustrates the circuit diagram of the present invention.

As shown in FIG. 7, the dust collection boards (10) contained in said main body (1) are stacked in such a order as: dust collection board (10)-low-potential enclosed conductive film (20)-dust collection board (10)-high-potential enclosed conductive film (20)-dust collection board (10), the safety distance of 0.5~1.5 mm/Kv is reserved between the edge of the electrode (220) of the enclosed conductive film (20) and the edge of the dust collection board (10), and the electret polarity of the dust collection board (10) corresponds to the electrode potential.

The main body (1) formed by stacking the dust collection boards (10) receives inter-layer adhesion at the ventilation side through thermal fusion, to make the edges of two adjacent dust collection boards (10) into one enclosed edge (50). Such methods as flame, surface ultrasonic friction and hot wire cutting, and the hot wire cutting is a preferred one. The advantage of the thermal fusion is that it can create a firm and nice fusion face, and conquer the problem that PP material is hard to be adhered.

In addition, two adjacent dust collection boards (10) are joined through hot-melt adhesive or binder, and in this way, the enclosed conductive film (20) is totally enclosed between the two dust collection boards (10). So entry of water into the film is prevented, and the present invention can also be easily washed.

Electrodes of high and low potentials of the enclosed conductive film (20) are connected to sheet metals through collective lines (60) of power supply formed by conductive adhesive, and then to the high-voltage power supply (40). The output voltage of the high-voltage power supply (40) is set to be 10 KV.

In the following the embodiment is tested, and the testing instruments and methods used are as follows:

EST102 vibration type field intensity tester for surface electrostatic field;
ANSI AHAM AC-1 standard testing cabin;
TSI8530 particle analyzer;
Tobacco smoke generator;
Power meter (milliwatt);
API400E (IZS) ozone analyzer (resolution 0.1 ppb);
Testing devices: see FIG. 13. The testing devices include: external power supply (7) and blower 5 and air duct 6 that can provide 240 cfm air flow for CADR (Clean Air Delivery Rate) testing. In the ozone testing, 50 cfm air flow is delivered.

CARD testing method: tobacco smoke method, according to ANSI AHAN AC-1 standard;
Ozone concentration testing method: according to UL-867 standard;
Surface potential testing method: 100 mm distance, 20 KV voltage, multiple point mean value.

As shown in FIG. 13, install the embodiment on the testing air duct (6) of 240 cmf flow, and place them in the testing cabin; test CARD value of tobacco smoke, detect input power of the high-voltage power supply and input power of the blower motor, and calculate energy efficiency ratio (EER) of CARD value to input power of the blower motor. On the testing air duct of 10 KV input voltage and 50 cmf air flow, test 24 h peak value of generated ozone. Testing results are shown in FIG. 16.

Embodiment 2

Being different from the embodiment 1, in the embodiment, the dust collection boards (10) undergo online electret polarization in the process of their formation by injection.

As shown in FIG. 3, the dust collection boards (10) are once formed by injection through the injection molding machine, and undergo electret processing and magnetization in this process. The process consists of three steps as follows:

a. The first positive or negative corona electret (121) processing is conducted at the outlet (1201) of the injection mold (12) and the inlet of the cooling section (1202), using such tools as needle board, wire board, wire, needle-medium baffle and wire-medium baffle, and the voltage difference of the electret varies from 10 Kv to 50 Kv;

b. The second electret (122) processing is conducted between the cooling section (1202) and traction section (1203) using needle board, wire board and wire-wire type electret, in which the polarity is opposite to that in the a) step, and the voltage difference of the electret varies from 5 Kv to 30 Kv;

c. At the front end (1204) of the cutting device, the third electret (123) processing is conducted with the same electret and polarity as the a step, and the voltage difference of the electret varies from 20 Kv to 70 Kv;

The electret polarization parameters used in the embodiment are as follows:

First electret: at the outlet (1201) of the mold: discharge needle (anode)+media insulation board (cathode), voltage difference being 50 KV.

Second electret: in the middle of the production line (i.e. cooling section (1202) and traction section (1203)): wire-wire type, polarity being opposite to that of the first electret, voltage difference being 30 KV.

Third electret: at the back of the production line (front end of cutting device (1204)): discharge needle (anode)+media insulation board (cathode), anode voltage being 20 KV and cathode voltage 40 KV.

From the corresponding face of the electrode at whose back electret polarization takes place, mark the electret polarity sign of the dust collection boards, "+" for anode and "−" for cathode.

A dust collection board (10) experiencing electret polarization is cut into 10 laminations, from which 3 ones are chosen at random and cut along the middle wall. 3 hours later, they are placed on the testing bench of the surface electric field, and the surface electrostatic voltage is tested at right, left and middle points. Mean value is obtained and shown in FIG. 16.

In the filter according to the embodiment, the marked "+" face corresponds to the high-potential enclosed conductive film, and the "−" to the low-potential film. CARD and ozone tests are conducted, and testing results are shown in FIG. 16.

Embodiment 3

The difference between the embodiment and the embodiment 1 is that the dust collection boards (10) undergo the foaming process.

As shown in FIG. 2, to the materials used for the dust collection boards (10) the microporous foaming agent using nitrogen as micro-foaming gas is added, foaming proportion being 0.1~10%, which, through injection stretch, form lens like or spindle shaped micro-bubbles (102). In the embodiment 3, the generally accepted technique in the injection molding industry is adopted. 0.2% azoic micro-foaming agent is added to PP raw material for foaming and injection molding. In the dust collection boards (10) formed, the foam accounts for 5%, and its diameter is 5-20 um. The foam is stretched into elliptic or lens-like micro-bubbles (102), and the dust collection boards (10) are around 3.1 mm thick.

In the embodiment, on the basis of the embodiment 1, the micro-bubbles are properly distributed over the plastic materials making up the dust collection boards (10), to form the cellular PP material. And in a proper manner, the macro electric doublet is shaped, which has the strongest electrostatic electret performance among the existing materials. The advantage of the embodiment is that the dust collection boards (10) undergo foaming treatment, causing micro protrusions on the hole walls, so that the specific surface area of the hole walls is increased, enabling easy collection of particles. The foaming technique can reduce consumption of the plastic materials, comply with the environmental demands, and also reduce the entire weight of the present invention.

Other steps are the same as the embodiment 1. The filter made in this way above is tested, and testing results are shown in FIG. 16.

Embodiment 4

In the embodiment, on the basis of the process conditions of the embodiment 3, the parameters of the embodiment 2 are used for electrostatic electret processing. In other words, in the embodiment, the dust collection boards (10) are made of foaming material, and experience on-line electrostatic electret processing during their formation through injection. The surface potential of the dust collection boards (10) is measured, and the filter made according to the embodiment is tested, with testing results shown in FIG. 16.

Embodiment 5

When CARD value of the filter made according to the embodiment 4 is tested, the high-voltage power supply does not work. The test on the filter made according to the embodiment shows that it has certain capability of dust collection even without power, and testing results are shown in FIG. 16.

Embodiment 6

In the embodiment, on the basis of the embodiment 3, the first additive (103) that can enhance the electret performance and prolong the storage time of charges is added to the materials making up the dust collection boards (10), as shown in FIG. 1. Said first additive (103) includes any kind of the following materials or combination thereof: disproportionated rosin, PVDF, PTFE, calcium stearate, aluminum palmitate and ferroelectrics, adding mass ratio ranging between 0% and 20%.

More particularly, in the embodiment, 5 um dia. $BaTiO_3$ ceramic powder and modified disproportionated rosin are added to the main PP material used to make the dust collection boards (10), and the screw extruder is used to make particles as concentrate; then the concentrate and microporous foaming agent are mixed with the PP material, and injected by the injection molding machine to form the dust collection boards. The mass ratio of the microporous foaming agent to the first additive (103) is as follows:

Micro-foaming agent: 0.2%;
$BaTiO_3$ ceramic powder: 2%;
Modified disproportionated rosin: 1%.

The electret parameters of the embodiment 2 are used for on-line electret processing, and the filter is made according to the embodiment. The surface potential is measured, and CARD value and ozone amount are tested, with testing results shown in FIG. 16.

Embodiment 7

In the embodiment, on the basis of the embodiment 6, the second additive (104) possessed of natural electret characteristics and emission characteristic of negative ion is added to the materials making up the dust collection boards (10), as shown in FIG. 1. Said second additive (104) includes mixture of electrical powder or tourmaline and lanthanide series, adding mass ratio ranging between 0% and 15%. And in the embodiment, said second additive (104) added is 4% electrical powder of 10 um diameter.

The electret parameters of the embodiment 2 are used for on-line electret processing, and the filter is made according to the embodiment. The surface potential is measured, and CARD value and ozone amount are tested, with testing results shown in FIG. 16.

Embodiment 8

In the embodiment, on the basis of the embodiment 7, the third additive (105) made of magnetic powders is further added, as shown in FIG. 1. Said third additive (105) includes dyestuff mainly containing $Fe_3O_4$, ferrite material and Nd—Fe—B material that can be externally magnetized, adding mass ratio ranging between 0.1% and 5%.

Figure 10:
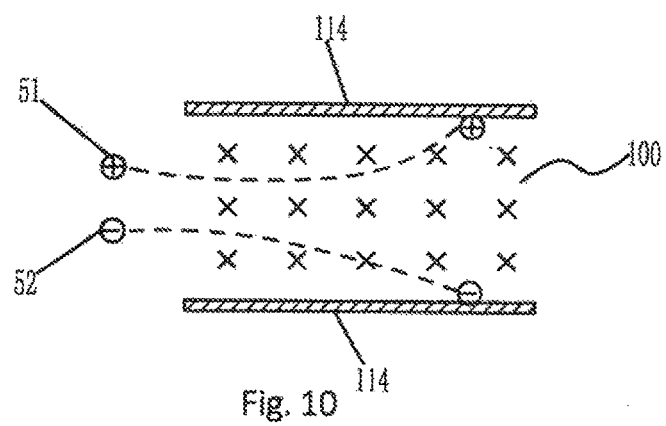
FIG. 10 illustrates the schematic diagram of course deflection of the charged particles in the magnetic filed in the holes of the present invention.

In the embodiment, in the process of making concentrate, 0.3% $Fe_3O_4$ powder of 1.00~200 nm diameter is added. As shown in FIG. 3, at the end of the injection production line of the dust collection boards (10), a magnetization mechanism (124) is set between the corona device having experienced the third electret (123) processing and the cutting device (1204), the magnetic field strength being 0.1~10 T, and 0.2 T is used in the embodiment. The upper and lower magnetic poles of the dust collection boards (10) are magnetized through contraposition. As shown in FIGS. 2 and 10, in the embodiment, magnetic materials are added to the plastic materials making up the holes (110) on the dust collection boards (10), and form the magnetic field (100) covering both upper and lower surfaces through external magnetization. Under the action of the magnetic field, the charged particles (51) (52) deflect to right and left from their course due to Lorentz force, and are then captured onto the surfaces of the right and left inner walls (114) of the holes.

In the embodiment, on the basis of the embodiment 1, the electret charging and magnetization techniques are combined for the dust collection boards (10), namely, the hot-state electrostatic electret processing is conducted at the outlet of the injection mold, then the reverse charging is performed after cooling, followed by electrostatic electret processing again, and finally magnetization is done, so as to maximize charge capturing efficiency, obtain high-voltage and long-duration electret material, and also create a magnetic field of even distribution.

The electret parameters of the embodiment 2 are used for on-line electret processing, and the filter is made according to the embodiment. The surface potential is measured, and CARD value and ozone amount are tested.

Embodiment 9

The difference between the embodiment and the embodiment 8 is that the dust collection boards are not magnetized. Testing results are shown in FIG. 16.

Embodiment 10

The making process is the same as the embodiment 8, but in the embodiment, the covered area of the electrode (220) of the enclosed conductive film (20) is replaced by the film electrode structure in which the pattern does not have full coverage, namely, the electrode (220) does not use the herringbone pattern as mentioned in the embodiment 1. Testing results are shown in FIG. 16.

Embodiment 11

Figure 8:
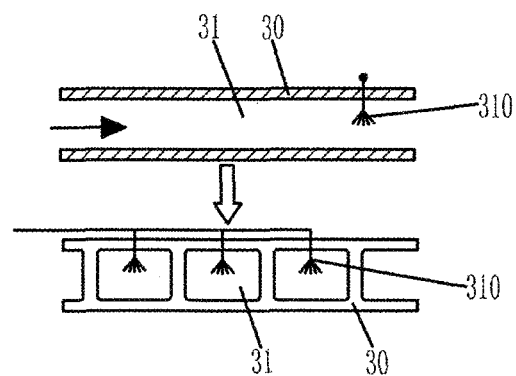
FIG. 8 illustrates the schematic diagram of the negative ion dust collection boards of the present invention.

In the embodiment, on the basis of the embodiment 8, negative ion emission electrodes are set. As shown in FIGS. 1 and 8, the main body (1) is disposed with one or more negative ion dust collection board (s) (30) having built-in negative ion emission electrode, within the hole (31) of said negative ion dust collection board (30) a negative ion emission electrode is housed, and said hole (31) of the negative ion dust collection board (30) is of symmetric structure. Near the end a needle or prickle-like brush emission electrode (310) made of W, Mo or stainless steel or a filamentous brush emission electrode (310) made of conductive carbon fiber is disposed, and the distance from the emission electrode (310) to the end is 1.0~1.5 mm/KV.

In the embodiment, on the top of the main body (1) a layer of negative ion dust collection board (30) having a built-in negative ion emission electrode (310) is placed. Said emission electrode (310) is made of 1.5 mm long conductive fibers that are disposed 5 mm inside the air outlet of each hole (31) and connected to the cathode of the high-voltage power supply (40).

In the embodiment, a layer of dust collection board of the main body (1) is disposed with a negative ion emission device in it, so that in the presence of air flow, the negative ions generated can be diffused to air, to charge the particles and so improve the dust collection effect. Testing results are shown in FIG. 16.

Embodiment 12

Figure 9:
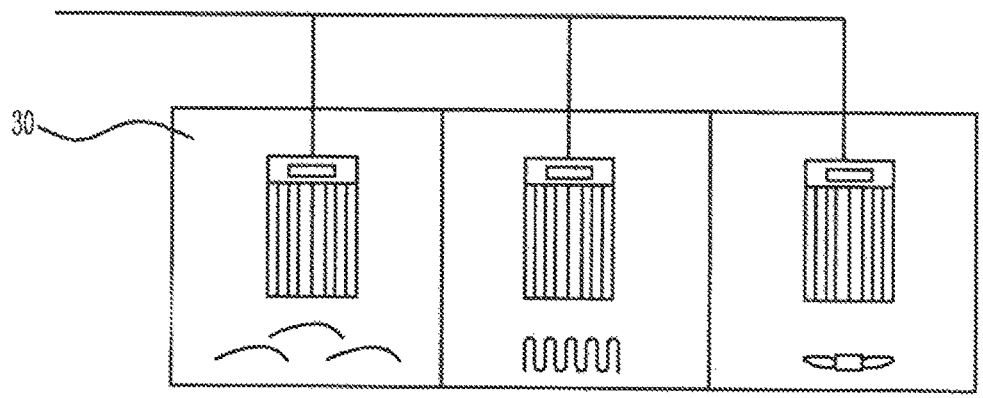
FIG. 9 illustrates the schematic diagram of the entire-structure electret processing technique of the present invention.

Uni-ESP made according to the embodiment 6 experiences entire electret polarization as follows:

As shown in FIG. 9, the filter is made according to the embodiment 6, and after integrally packaged, undergoes entire electret processing by an electret device (120), and the process consists of the steps as below:

First, the contact (41) or socket is allowed to supply power to the main body (1) of the filter, and with power on, the subsequent steps are performed;

Next, vapor (121) or hot air is used to heat the filter to 70~100° C., and the reached temperature is maintained for 0~30 min;

Then, the filter is placed in the heater (122) for 0~60 min at 60~80° C.;

Last, air or cool air (123) is allowed to quickly pass through the holes (110) of the dust collection boards (10) of the filter for 1~20 min, to cool down the filter.

In the process of electret processing above, the methods and parameters adopted are as follows:

The external power supply is of DC-12V, and the set temperature of the heater (122) is 80° C. The filter is placed in the thermostat, into which the vapor (121) produced out of pure water is supplied. The vapor (121) is condensed on the hole (110) walls of the dust collection boards (10), and 5 min later, vapor supply is ceased; the filter is placed in the heater (122) for drying for about 10 min; and then it is taken out of the heater, and ambient air is blown to it at a flow rate of 10~800 m3/h along the holes, for about 5 min. The external power supply is cut off, and then the final product is formed.

In the embodiment, the integrated-structure electrostatic dust collection device undergoes entire electret processing. It is connected to the high-voltage power supply (of high and low potentials), and experiences the process of heating-holding-quick cooling, so as to acquire better performance. In the meanwhile, through entire electret processing, the device can also be tested for sealing, temperature resistance, insulation and power supply performance, and defects in it may be detected and removed.

The filter having gone through entire electret polarization is installed on the testing air duct, and receives CARD and ozone tests. Testing results are shown in FIG. 16.

Embodiment 13

The filter made according to the embodiment 7 experiences entire electret polarization. In other words, the filter is made to undergo entire electret polarization according to the embodiment 12. CARD and ozone tests are conducted, and testing results are shown in FIG. 16.

Embodiment 14

The filter made according to the embodiment 8 experiences entire electret polarization. In other words, the filter is made to undergo entire electret polarization according to the embodiment 12. CARD and ozone tests are conducted, and testing results are shown in FIG. 16.

Embodiment 15

The filter made according to the embodiment 11 experiences entire electret polarization. In other words, the filter is made to undergo entire electret polarization according to the embodiment 12. CARD and ozone tests are conducted, and testing results are shown in FIG. 16.

Embodiment 16

In testing the filter made according to the embodiment 8, the supply voltage of the high-voltage power supply is adjusted to 6 KV.

Embodiment 17

In testing the filter made according to the embodiment 8, the supply voltage of the high-voltage power supply is adjusted to 8 KV.

Embodiment 18

In testing the filter made according to the embodiment 8, the supply voltage of the high-voltage power supply is adjusted to 12 KV.

Embodiment 19

Figure 14:
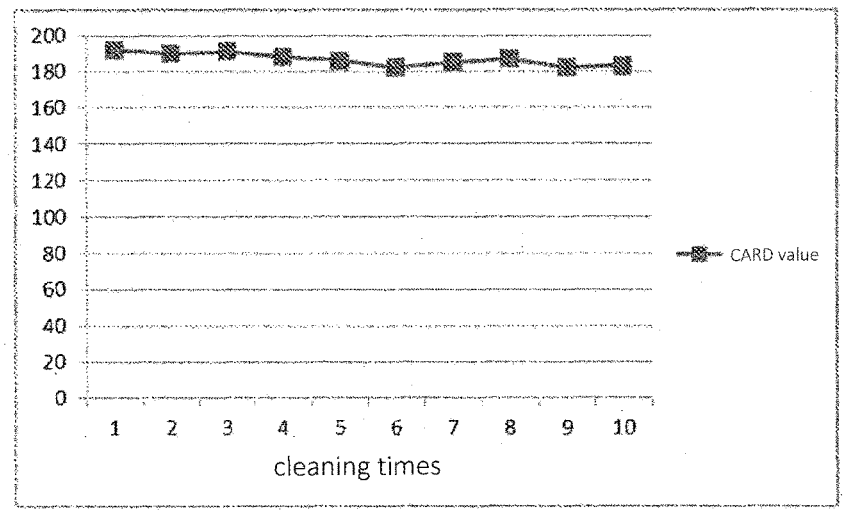
FIG. 14 illustrates the CADR variation trend chart according to the embodiment 19 of the present invention.

The filter made according to the embodiment 14 is immersed in hot water of 80° C. for 10 min, and then taken out and shook to remove water from holes. And it is put in a place where good ventilation is provided, for one hour. CARD test is conducted, as shown in FIG. 14. The test is repeated once each day, and conducted for totally 10 days. Testing results are shown in FIG. 17, and indicate that the additives, electret technique and structural sealing design used for the prevent invention provides it with expected performance in temperature adaptation and water sealing.

Embodiment 20

Figure 15:
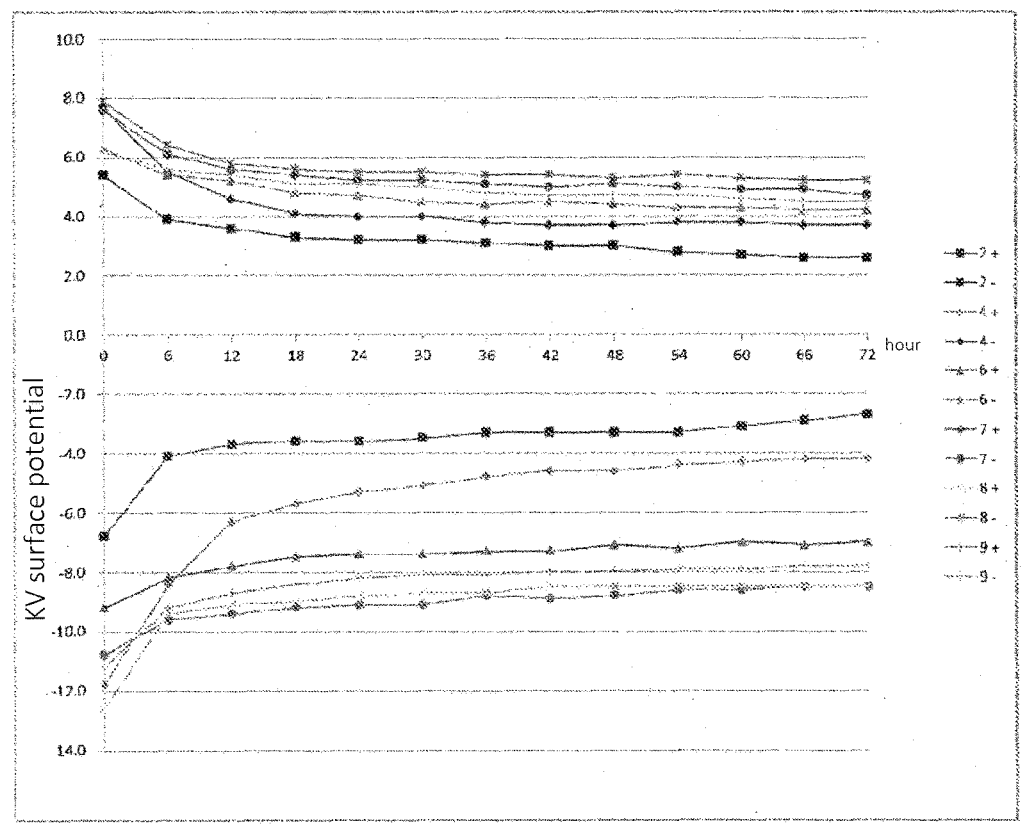
FIG. 15 illustrates the variation trend chart of the surface potential according to the embodiment 20 of the present invention.

The dust collection boards of the embodiments 2, 4, 6, 7, 8 and 9 are cut in the center and used for testing surface voltage. They are placed at ambient temperature. Surface voltage is tested at 6 h intervals, and the test is conducted for 12 times in succession (72 h). Testing results are shown in FIGS. 15 and 18, and indicate that the additives and electret technique used for the prevent invention provides it with the long storage time of charges.

In a word, the present invention discloses an integrated-structure electrostatic dust collection device (Uni-ESP). It is known that the charged particles running in the electric field may deflect from their course due to Coulomb force, while in the magnetic field, they may deflect due to Lorentz force; the acting force they receive varies with the intensity of the electric field and magnetic field. The working principle of the electrostatic dust collection structure involves two important factors, i.e. charge and deflection force of particles. To them, the present invention presents the right solutions.

I. To charge of particles, the present invention presents three solutions:

1) The upper wall (111) and lower wall (112) (set at a side of the electrode (220)) of the rectangular holes of the dust collection boards (10) are designed to be asymmetric, and on them different number of fins are distributed. The top of the fins (relative to the root connected to the inner wall of the holes (110)) is of small curvature radius structure. Under the action of the internal electric field, said top may emit electrons to form a corona zone, so that the entering particles are charged. The details can be found in the embodiment 1.

2) The additives that can enhance electret performance and prolong charges' storage time are added to the plastic materials making up the hole walls and fins, such as tourmaline. This kind of materials is in nature capable of emitting negative ions, and the negative hydroxyl ions and negative oxygen ions produced by them can transfer charges they carry to particles or be absorbed by particles, to make particles charged. The details can be found in the embodiment 7.

3) A built-in negative ion emission device is installed. In the presence of air flow, the negative ions produced are diffused to air, to charge particles. The details can be found in the embodiment 11.

As for deflection force, the present invention provides two kinds of deflection force for charged particles as follows:

1) Deflection in the electric field. The electric field created by the electrodes of high and low potentials and the electric field by the electret effect produce Coulomb force upon charged particles, and make them deflect from their course and at last be captured onto the surfaces of the upper wall (111) and lower wall (112) of the holes.

2) Deflection in the magnetic field. The magnetic materials, added to the plastic materials making up the holes (110), form the magnetic field covering both upper and lower surfaces through external magnetization, and under the action of the magnetic field, the charged particles are deflected to right and left from their course due to Lorentz force, and at last captured onto the surfaces of the upper wall (111) and lower wall (112) of the holes. The details can be found in the embodiment 8.

In this way, the present invention uses both electric field deflection and magnetic field deflection techniques, increasing particle capturing efficiency, making full use of all surfaces of hole walls, and also improve dust containing capacity.

The holes (110) of non-symmetric structure used for the present invention also bring the following advantages:

1) The use of the non-symmetric structure increases the internal surface area of the holes, shortens the distance between the internal surface walls, allows the particles to come into contact with the inner walls and then be captured within a shorter range, and realizes greater capturing efficiency by use of possibly shortest holes.

2) The use of the non-symmetric structure renders distribution of the internal electric field non-symmetric, so that the non-charged particles or those that cannot be easily charged can be efficiently captured.

3) In the present invention, the hole arrays of curved structure can also be made. When air carrying particles passes through the hole arrays, the particles can more easily come into contact with the hole walls and so be more efficiently captured.

The present invention offers solutions to the problems that the general plastic materials have poorer electret performance and that the storage time of the electret charges is shorter, and it also discloses an innovative method that combines direct electret charging and filter charging as a whole for the dust collection boards, so as to further enhance the electret performance.

For the sake of lower cost and higher structural strength, PP material is preferred for the holes of the integrated-structure electrostatic dust collection device, and to it the additives that can enhance the electret performance and prolong charges' storage time and thermal stability are added.

The patent no. CN102046871 discloses "A Electret Material Containing Charge Enhancement Additives", and more particularly a method of synthesizing and adding N-substituted amino carbon cyclic aromatics; the patent no. CN101905101A discloses "A Preparation Method of Melt Blown Polypropylene Electret Filter Material"; the patent no. CN1226293A discloses "Ferroelectric Fiber and Its Application", and uses the ferroelectric fiber to improve the electret performance; the patent no. CN101421802A discloses "Electret Material", and uses "hindered hydroxylamine ester compounds" to enhance the electret's thermal and charge stability; and the patent no. CN101511485A discloses "Electret Finishing Agent", and uses coating to enhance the electret performance. The patent applications above prove that by adding auxiliary agents to the plastic materials, the electret performance can be greatly improved; besides, the patented technologies above have been widely used in such fields as electrostatic electret fiber, electret microphone and sensor. The electret-related technical solution adopted by the present invention is not yet seen in the related patents at home and abroad.

The above descriptions are only embodiments of the present invention, not limiting the scope of the present invention patent, and any equivalent transformation or modification using the structures, features and principles as described in the scope of patent application of the present invention is similarly included in the scope of patent application of the present invention.

I claim:

1. An integrated-structure electrostatic dust collection device, comprising: an outer frame and main body packaged within said outer frame, wherein said main body consists of many micro electrostatic dust collection cells integrated in the form of array, each said micro electrostatic dust collection cell has a linear or curvilinear hole for air to pass through, an upper wall and lower wall of said hole are of non-symmetric structure, on an upper wall and lower wall of eudipleural fins are distributed, and an upper and lower surface of said micro electrostatic dust collection cells are disposed with an enclosed conductive film applied with a high-voltage electric field; a high-voltage power supply used for applying said high-voltage electric field is packaged within said outer frame, to which an external contact or socket located on said outer frame is used to supply power.

2. The integrated-structure dust collection device as claimed in claim 1, wherein said micro electrostatic dust collection cells are integrated on a dust collection board, said dust collection board is formed by injecting materials of electret nature, and to the materials making up said dust collection board any kind of the following materials or combination thereof can be added:
   a. microporous foaming agent using nitrogen as microfoaming gas, whose mass ratio ranges between 0.1% and 10%, and which can form lens like or spindle shaped micro-bubbles within the dust collection boards through injection stretch;
   b. first additive that can enhance the electret performance and extend the storage time of charges, including disproportionated rosin, PVDF, PTFE, calcium stearate, aluminum palmitate and ferroelectrics, which can be added alone or in a combined fashion, adding mass ratio ranging between 0% and 20%;
   c. second additive possessed of natural electret characteristics and emission characteristic of negative ion, including mixture of electrical powder or tourmaline and lanthanide series, adding mass ratio ranging between 0% and 15%;
   d. third additive made of magnetic powders, including dyestuff mainly containing Fe3O4, ferrite material and Nd—Fe—B material that can be externally magnetized, adding mass ratio ranging between 0.1% and 5%.

3. The integrated-structure dust collection device as claimed in claim 1, wherein said enclosed conductive film forms the "film-electrode-film" composite structure through adhesion, thermal sealing and ultrasonic, and the electrode is made on a layer of film in the intended pattern through printing or vacuum coating.

4. The integrated-structure dust collection device as claimed in claim 3, wherein said film refers to thin film, hole film and microporous film, and they are made of PP, PE, PET or PTFE; said electrode is formed by:
   a. low-resistance self-healing vacuum aluminum film, resistance ranging between 0.1 Ω/m and 100 Ω/m; or
   b. high-resistance printable film that is made of metal oxide, carbon macromolecular conductive material and adhesive material, resistance ranging between 10E8 Ω/m and 10E11 Ω/m;
   and said high-resistance electrode is printed in the intended pattern, and said pattern is a herringbone pattern having line edges and sharp prickles on it, and the coverage of electrode varies from 10% to 90%.

5. The integrated-structure dust collection device as claimed in claim 3 or 4, wherein the dust collection boards contained in said main body are stacked in such an order as: dust collection board-low-potential film electrode-dust collection board-high-potential film electrode-dust collection board, the safety distance of 0.5~1.5 mm/Kv is reserved between the edge of the film electrode of the enclosed conductive film and the edge of the dust collection board, and the electret polarity of the dust collection board corresponds to the electrode potential; the two adjacent dust collection boards are stacked in an overlapping manner, or alternately at an angle of 1~30°.

6. The integrated-structure dust collection device as claimed in claim 1, 2, 3 or 4, wherein said main body is disposed with one or more negative ion dust collection board(s) having built-in negative ion emission electrode, within the hole of said negative ion dust collection board a negative ion emission electrode is housed, and said hole of the negative ion dust collection board is of symmetric structure; near the end a needle or prickle-like brush emission electrode made of W, Mo or stainless steel or a filamentous brush emission electrode made of conductive carbon fiber is disposed, and the distance from the emission electrode to the end is 1.0~1.5 mm/KV.

7. The integrated-structure dust collection device as claimed in claim 1, 2, 3 or 4, wherein said two adjacent dust collection boards are joined through hot-melt adhesive or binder, and the edges of these two adjacent dust collection boards are bonded through thermal fusion into an enclosed edge.

8. The integrated-structure dust collection device as claimed in claim 6, wherein said high-voltage power supply is installed at any side of the main body where neither inlet nor outlet is set; the output end of said high-voltage power supply is connected to ends of high and low potential of each layer of enclosed conductive film through collective line, and the negative high-voltage end of said high-voltage power supply is connected to the negative ion emission electrode on the negative ion dust collection board.

9. The integrated-structure dust collection device as claimed in claim 1, wherein said outer frame is made of plastic or metal, and the main body and the high-voltage power supply are integrally packaged in the outer frame through sealing process, namely, a seal coating is formed between the outer frame and main body, and on the outer frame a socket or contact (41) is installed for supplying power to the high-voltage power supply (40).

* * * * *